United States Patent [19]

Tomori et al.

[11] Patent Number: 4,589,750
[45] Date of Patent: May 20, 1986

[54] ADAPTER FOR CONNECTING SINGLE-LENS REFLEX CAMERA LENS TO VIDEO CAMERA

[75] Inventors: Yasumasa Tomori; Sadao Okudaira; Harumi Aoki; Fumio Urano; Tahei Morisawa, all of Tokyo, Japan

[73] Assignee: Asahi Kogaku Kogyo Kabushiki Kaisha, Tokyo, Japan

[21] Appl. No.: 594,052

[22] Filed: Apr. 28, 1984

[30] Foreign Application Priority Data

Mar. 28, 1983 [JP] Japan .................................. 58-52003

[51] Int. Cl.⁴ .......................... G03B 17/26; G03B 9/02; H04N 5/238
[52] U.S. Cl. ................................ 354/271.1; 352/141; 358/228
[58] Field of Search .................. 354/271.1, 286, 289.1, 354/289.12, 455; 352/141; 358/228

[56] References Cited

U.S. PATENT DOCUMENTS

| | | | |
|---|---|---|---|
| 3,722,390 | 3/1973 | Schlapp et al. | 354/286 |
| 3,928,858 | 12/1975 | Sakurada et al. | 354/289.1 |
| 3,968,504 | 7/1976 | Komine | 354/286 X |
| 4,322,144 | 3/1982 | Suzuki et al. | 354/455 X |
| 4,372,663 | 2/1983 | Oshima | 354/286 |
| 4,400,072 | 8/1983 | Suzuki et al. | 354/455 |
| 4,460,253 | 7/1984 | Kawai et al. | 354/271.1 X |

FOREIGN PATENT DOCUMENTS 134571 3/1979 Fed. Rep. of Germany ...... 354/289

Primary Examiner—William B. Perkey
Attorney, Agent, or Firm—Sughrue, Mion, Zinn, Macpeak, and Seas

[57] ABSTRACT

An adapter for connecting an interchangeable lens, such as a lens which is ordinarily intended for use with a single-lens reflex camera, for which the distance from the rear surface on the lens to a focal plane is relatively great, to a camera body, such as a video camera body, for which the distance from the front surface of the lens mount to a focal plane is relatively small. The adapter includes a diaphragm, which is used in place of the diaphragm of the interchangeable lens, and an electric motor for controlling the aperture value provided by the diaphragm. The aperture data supplied by the interchangeable lens is transmitted to the camera body as electrical data, which is preferably produced with a variable resistor or the like. Contacts are provided on the casing of the adapter for transmitting data to the camera body and receiving an operating signal for the motor from the camera body.

7 Claims, 5 Drawing Figures

ADAPTER FOR CONNECTING SINGLE-LENS REFLEX CAMERA LENS TO VIDEO CAMERA

BACKGROUND OF THE INVENTION

The present invention relates to an adapter for allowing the use of an interchangeable camera lens, such as may be originally intended for use with a single-lens reflex still camera, with a motion picture camera such as a video camera.

Although an interchangeable lens intended for use with a single-lens reflex camera has a longer distance to the focal plane from the rear flange of the lens and ordinarily forms an image of a size larger than a lens customarily used for a video camera, such an interchangeable lens can nevertheless be used with a video camera if the lens is connected thereto via an adapter which compensates for these differences. Although a conventional adapter may allow the video camera in such a case to be used to take still picutres, it is impossible to interlock the interchangeable lens and the video camera body, and therefore it is impossible to use the interchangeable lens in an automatic aperture mode needed to take motion pictures because the aperture setting cannot be continuously changed.

Accordingly, an object of the invention is to provide an adapter which allows automatic aperture setting, and hence motion picture taking, when, for instance, an interchangeable lens originally intended for use with a single-lens reflex camera is used with a video camera body.

SUMMARY OF THE INVENTION

The foregoing and other objects of the invention have been achieved by the provision of an adapter for a camera which, according to the invention, includes an aperture controlling diaphragm (iris diaphragm) used in place of the diaphragm of the interchangeable lens, means for transmitting aperture value data set by an aperture value setting member of the interchangeable lens to the diaphragm of the interchangeable lens, means for converting the aperture value data into electrical data, and electrical contacts for transmitting the electrical data to the camera body and receiving from the camera body an operating signal for an electric motor which positions the diaphragm of the adapter.

BRIEF DESCRIPTION OF THE DRAWINGS

FIGS. 2 and 3 show a first example of an adapter constructed according to the invention, of which FIG. 2 is an explanatory diagram showing the adapter connected between an interchangeable lens and a camera body and FIG. 3 is an exploded perspective view showing essential components of the lens, adapter and camera body in FIG. 2;

DESCRIPTION OF THE PREFERRED EMBODIMENTS

The invention will now be described with reference to preferred embodiments thereof.

Figure 1:
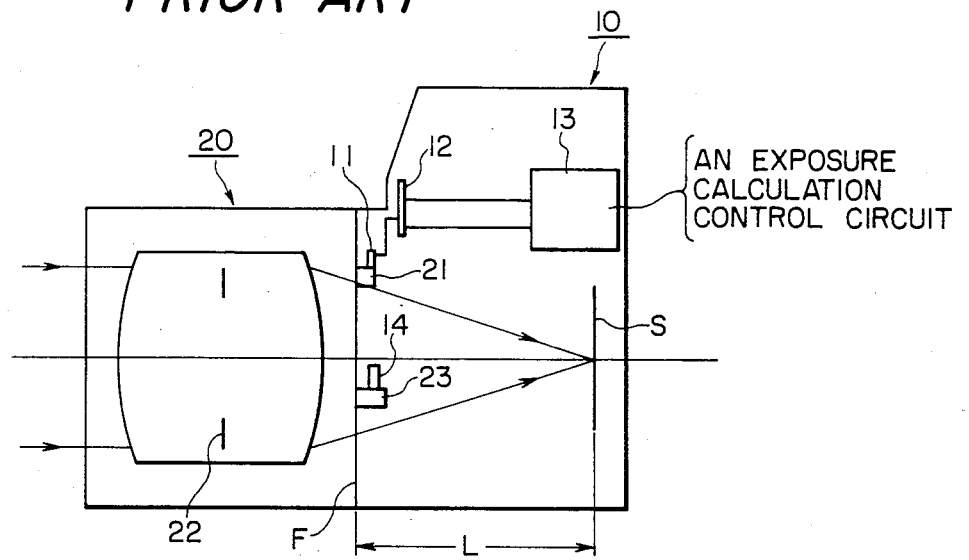
FIG. 1 is an explanatory diagram showing a single-lens reflex camera.

FIG. 1 shows the body 10 of a single-lens reflex camera and an interchangeable lens 20 mounted on the body 10. In FIG. 1, reference character L designates the distance from the rear flange of the lens to the focal plane, F the flange surface, and S the focal plane. The interchangeable lens 20 has an aperture value setting member, namely, an aperture ring (not shown). As the aperture value setting member is turned, an aperture value transmitting member 21 is turned and an aperture value link member 11 of the body 10 is turned in association with the rotation of the aperture value transmitting member 21. The aperture value link member 11 varies the resistance setting of a variable resistor 12, from which electrical data corresponding to the set aperture value is obtained. An exposure calculation control circuit 13 in the body 10 calculates a correct exposure value in response to the electrical data thus obtained, from which a suitable shutter speed is determined. In the described embodiment, the diaphragm 22 of the interchangeable lens 20 is a normally closed diaphragm which is biased toward the closed position, and therefore its aperture value is a minimum when an aperture control (opening and closing) member 23 is not operated.

When the interchangeable lens 20 is mounted on the body 10, an aperture release member 14 on the body 10 is engaged with the diaphragm control member 23 so as to maintain the diaphragm 22 open. When the shutter is released, the aperture release member 14 is retracted to a position where it will not interfere with the diaphragm control member 23. As a result, the diaphragm 22 is stopped down to the set aperture value substantially instantaneously so that a correct exposure is obtained.

The diaphragm 22 may be a normally open diaphragm which is fully opened when no external force is applied to the diaphragm control member 23. In this case, the release member 14 is replaced by a stopdown member which is turned in the direction of stop down when the shutter is released.

Figure 2:
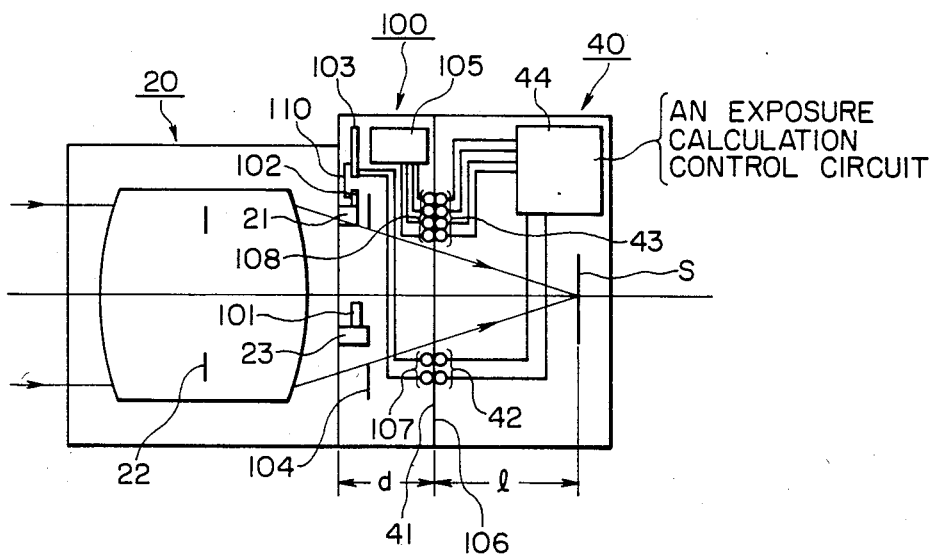
Figure 3:
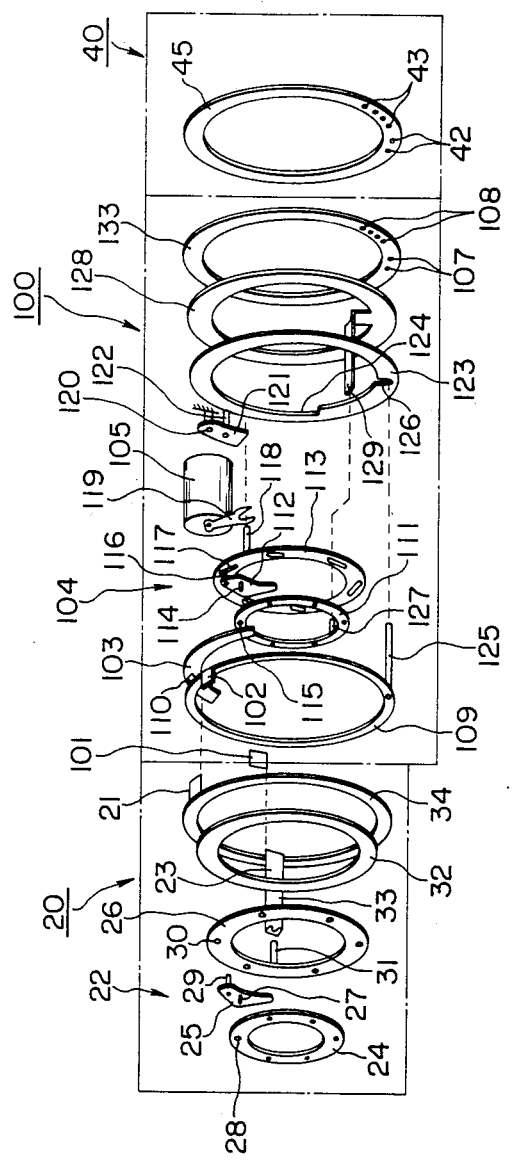

Described above is an ordinary single-lens reflex camera, many examples of which are known in the art. The invention is intended to provide an adapter 100 which allows the use of the above-described interchangeable lens 20 in an automatic aperture mode on a camera body 40 (such as a video camera body), the distance to the focal plane and the image size of which are smaller than those of the single-lens reflex camera. FIG. 2 shows the eseential elements of the inventive adapter and FIG. 3 shows examples thereof.

The length (thickness) d of the adapter 100 in the direction of the optical axis is equal to the difference between the distance L between the rear surface of the flange of the lens and the focal plane of the single-lens relfex camera and the distance between the rear surface of the flange of the lens and the focal plane of the video camera. By setting the length d in this manner, the interchangeable lens 20 can be optically used with the camera body 40. In FIG. 2, reference character S designates the focal plane of the camera body 40.

The use of the adapter of the invention 100 will be described with reference to FIG. 2. The adapter 100 has an open state maintaining member 101 which, when the adapter 100 is engaged with the interchangeable lens 20,

MISSING PAGE TEMPORARY NOTICE

PATENT # 4589750 FOR ISSUE DATE 5-20-1986 HAS BEEN SCANNED, BUT WITH MISSING PAGE(S). UPON RECEIVING OF MISSING PAGE(S), THE ENTIRE DOCUMENT WILL RE RESCANNED. PLEASE CALL IMAGE DATA ADMINISTRATION STAFF OF 557-6154 IF YOU HAVE A QUESTION. ASK FOR DAVE GROOMS, ANITA YOUNG OR POLA JONES.

THIS NOTICE IS FOR THE MISSING PAGE CONTAINING:

COLUMN # 3/4 ing pin 125 fixed to the aperture value link ring 109 and an interlocking groove 126 formed in the cam ring 123 into which the interlocking pin 125 is inserted. The configuration of the cam surface 124 is designed so that, when the cam ring 123 is turned in an amount according to an aperture value set on the side of the interchangeable lens 20, the diaphragm control ring is turned through an angle corresponding to the aperture value thus set. That is, the angle of rotation of the diaphragm control ring 113 is regulated by the operating pin 118, the intermediate lever 121, the regulating pin 122 and the cam surface 124.

Figure 4:
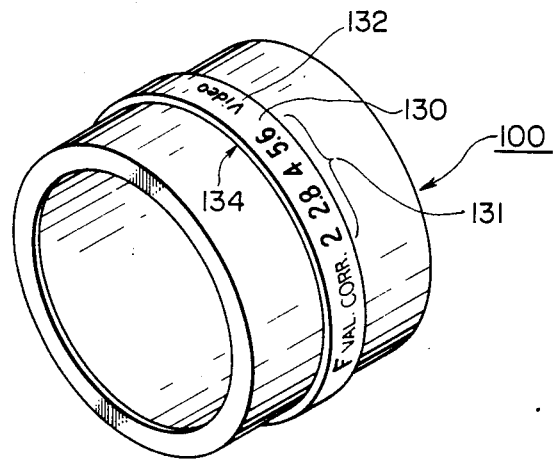
FIG. 4 is a perspective view showing an example of an F-value correction and video changeover ring of the adapter of the invention.

A correcting pin 127 is fixed to the aperture support ring 111. The pin 127 is engaged with the interlocking arm 129 of a correcting ring 128 in such a manner that the aperture operating ring 113 is turned by turning the correcting ring 128. The correcting ring 128 is interlocked with an F-value correction and video changeover ring 130 (FIG. 4) which can be operated from outside the adapter 100. In the case where the interchangeable lenses to be mounted on the intermediate adapter 100 have different fully open aperture F values, the F-value correction and video changeover ring 130 is used to conform the open aperture diameter of the diaphragm 104 to those values and to switch the present photographing mode over to a video photographing mode.

The aforementioned correction is carried out by the utilization of the fact that as the support ring 111 is turned, the open aperture diameter of the lens is changed. Accordingly, the support ring 111 and the diaphragm control ring are so designed as to conform to an equal interval aperture system in which the angle of rotation for changing an aperture value by one step is equal.

When the "VIDEO" mark 132 of the F-value correction and video changeover ring 130 is aligned with an index 134, the support ring 111 sets the diaphragm 104 in the fully closed position. When, under this condition, the diaphragm control ring 113 is turned by the motor 105, the degree of opening of the diaphragm is continuously changed. Thus, motion picture photographing can be carried out. If interchangeable lenses 20 to be mounted on the adapter 100 all have the same F value, then it is not necessary to replace the diaphragm 104 with an equal interval diaphragm, and it is not necessary to provide the F-value correcting mark 132. If it is not desired to take motion pictures, the F-value correction and video changeover ring 130 and the correcting ring 128 may be eliminated.

Further in FIG. 3, reference numeral 133 designates an electrical contact ring on which the aperture data electrical contacts 107 and 108 are mounted. The contacts 107 are connected to the variable resistor 103 and the contacts 108 are connected to the motor 105 (the connection being shown in FIG. 2). The electrical contacts 42 and 43 on the side of the camera body 40 are located on an electrical contact ring 45. When the adapter 100 is mounted on the camera body 40, the contacts 42 and 43 are electrically connected to the contacts 107 and 108 since they are pressed thereagainst under pressure.

It goes without saying that other necessary components of a still camera or video camera, such as the above-described exposure calculation control circuit 44, a photometric device, a shutter, a film or tape supplying device, a viewfinder and a power source are provided in the camera body 40.

Four contacts 108 and four mating contacts 43 are provided to apply a drive signal and a speed adjusting control signal to the motor 105 for taking motion pictures. However, if it is not desired to take motion pictures, two of the contacts 108 and two of the mating contacts 43 may be eliminated. Of course, mounts are formed on both ends of the adapter 100 which are suitably coupled to the connecting mounts of the camera body 40 and the interchangeable lens 20, respectively.

When the adapter 100 thus constructed is mounted between the camera body 40 and the interchangeable lens 20, the diaphragm 22 is maintained fully open by the open state maintaining member 101. Under this condition, an aperture value is set by the aperture value setting member of the interchangeable lens 20. In this operation, the ring 34 is turned, the aperture value link ring 109 is turned through the aperture value transmitting member 21 and the aperture value link member 102, and the resistance of the variable resistor 103 is set to a value corresponding to the desired aperture value so that electrical data (aperture value data) corresponding to the resistance setting is applied through the aperture data contacts 107 and 42 to the exposure calculation control circuit 4 in the camera body 40.

When the aperture value link ring 109 is turned, the cam ring 123 is turned through the interlocking pin 125 and the interlocking groove 126, whereby the intermediate lever 121 is set by the cam surface 124 and the regulating pin 122 so that the aperture operating ring 113 is positioned at an angle corresponding to the set aperture value. Thus, the mechnical aperture data is transmitted to the diaphragm 104.

On the other hand, in the camera body 40, the transmitted aperture data and the photometric data relating to the object are utilized to calculate a shutter speed. Upon release of the shutter, current is applied through the motor controlling contacts 43 and 108 to the motor 105, as a result of which the diaphragm ring 113 is turned by the driving lever 119 and the operating pin 118 through an angle corresponding to the set aperture value which is specified by the cam surface 124. The shutter is opened for a predetermined period of time, thus accomplishing the exposure. Then, the application of current to the motor is stopped. As a result, the diaphragm 104 is opened by the elastic force again.

The invention has been described with reference to the still picture taking operation in which the F value of the interchangeable lens 20 is corrected with the F-value correcting mark 131 on the F-value correction and video changeover ring 130 if necessary. When motion pictures are to be taken wherein the camera body is replaced with a video camera, the F-value correction and video changeover ring 130 is turned to align the "VIDEO" mark 132 with the index 134 so that the aperture is fully closed. In the camera body 40, the photometric device and the exposure calculation control circuit 44 operate to produce a signal according to the luminance of the object. This signal is applied through the contacts 43 and 108, as an operating signal including a drive signal and a control signal, to the motor 105 so that the latter continously varies the aperture size of the diaphragm 104. Therefore, motion pictures can successfully be taken using a lens originally intended for use with a single-lens reflex camera.

Figure 5:
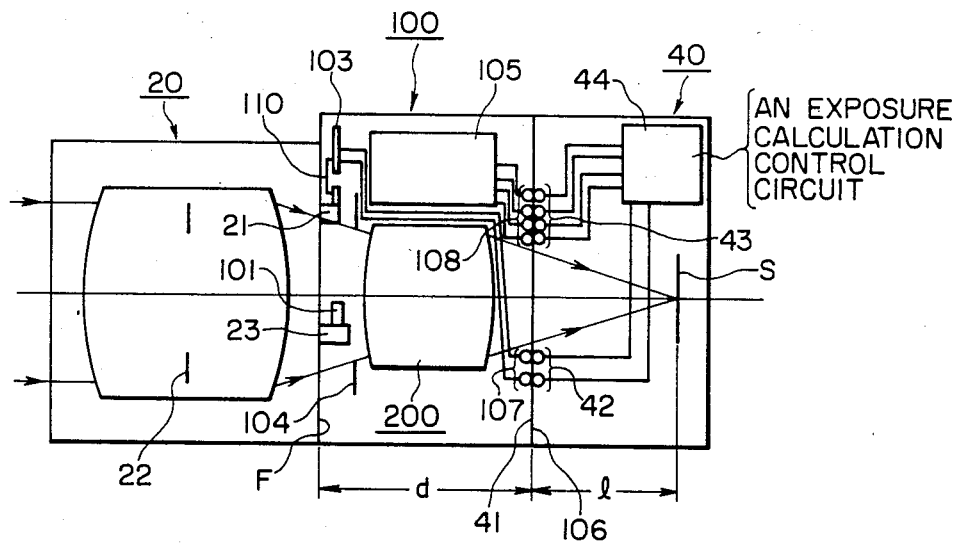
FIG. 5 is an explanatory diagram showing a second example of an adapter constructed according to the invention.

FIG. 5 shows a second embodiment of the invention. In this embodiment, the thickness d of the adapter 100 is set to the value which is obtained by subtracting the distance l from the distance L as described above. However, depending on the actual values of l and L, the thickness d may not be sufficiently large. According to the second embodiment, the thickness d can be made sufficiently large by providing an optical system, specifically, a relay lens 200 for lengthening the optical path between the flange surface F of the interchangeable lens 20 and the focal plane S in the camera body 40. The relay lens 200 is provided as part of the adapter 100. With this arrangement, the thickness d of the adapter 100 can be set to a desired value. Accordingly, components of the adapter 100, such as the diaphragm 104, can be designed with a high degree of freedom. The other elements of the adapter of the second embodiment are completely the same as those in FIG. 3.

As is apparent from the above description, when the adapter of the invention is used for camera systems having different distances from the rear flange surface F of the interchangeable lens 20 and the focal plane S in the camera body 40, the relay lens 200 is provided as part of the adapter 100. With this arrangement, the thickness d of the adapter 100 can be made any desired practical value. Accordingly, components of the adapter 100, such as the diaphragm 104, can be designed with a high degree of freedom. The other elements of the adapter of the second embodiment are completely the same as those in FIG. 3.

As is apparent from the above description, when the adapter of the invention is used for camera systems having different distances from the front surface of the lens mount to the focal plane, various types of interchangeable lenses can still be used. Furthermore, since the diaphragm of the interchangeable lens is not used, the transmission loss of an aperture setting force, which might otherwise occur if the aperture of the interchangeable lens were operated through the interlocking member of the adapter on the camera body side, is eliminated. In addition, as the electrical data specifying the aperture setting for the adapter can be set irrespective of the interchangeable lens, electrical power is economically used.

We claim:

1. An adapter for connecting an interchangeable lens for which a first distance from the rear surface of the lens to a focal plane is relatively great to a camera body for which a second distance from the front surface of a lens mount to a focal plane is relatively small, comprising:
   compensating means for optically compensating for a difference between said first and second distances;
   a diaphragm and an electric motor for controlling an aperture value provided by said diaphragm;
   aperture value data transmitting means for transmitting aperture value data provided by an aperture value setting member of said interchangeable lens to said camera body as electrical data; and
   electrical contacts for transmitting said electrical data to said camera body and receiving an operating signal for said motor from said camera body.

2. The adapter as claimed in claim 1, wherein said diaphragm comprises a support ring for rotatably supporting fulcrum pins of a plurality of diaphragm blades; and a diaphragm control ring engaged with rotary pins of said blades in such a manner as to open and close said diaphragm in response to rotation of said diaphragm control ring, said diaphragm control ring being coupled to said motor to be rotated thereby.

3. The adapter as claimed in claim 1, wherein said aperture value data transmitting means comprises an interlocking ring turned in association with said aperture value setting means of said interchangeable lens; and a cam ring for rotatably positioning said support ring at an angle corresponding to an aperture value set by said interlocking ring.

4. The adapter as claimed in claim 2, further comprising an F-value correcting ring for turning said support ring to correct an open-aperture F value of said diaphragm according to an open-aperture F value of said interchangeable lens.

5. The adapter as calimed in claim 4, wherein said F-value correcting ring has a "VIDEO" mark thereon, and when turned to select said "VIDEO" mark, said F-value correcting ring turns said support ring so that said diaphragm is fully closed.

6. The adapter as claimed in claim 1, wherein said compensating means comprises an optical system for changing the length of an optical path between a flange surface of said interchangeable lens and the focal plane of said camera.

7. The adapter as claimed in claim 1, wherein said compensating means comprises means for changing the physical distance between a flange surface of said interchangeable lens and the focal plane of said camera.

* * * * *